United States Patent
DuBois et al.

(10) Patent No.: US 9,526,259 B2
(45) Date of Patent: Dec. 27, 2016

(54) VEHICLE MOUNTABLE FISH HANGING HOOK APPARATUS

(71) Applicants: Cheryl Renee DuBois, Harrisburg, AR (US); Bruce Alan DuBois, Harrisburg, AR (US)

(72) Inventors: Cheryl Renee DuBois, Harrisburg, AR (US); Bruce Alan DuBois, Harrisburg, AR (US)

( * ) Notice: Subject to any disclaimer, the term of this patent is extended or adjusted under 35 U.S.C. 154(b) by 0 days.

(21) Appl. No.: 14/668,906

(22) Filed: Mar. 25, 2015

(65) Prior Publication Data

US 2016/0278397 A1 Sep. 29, 2016

(51) Int. Cl.
*A22C 25/04* (2006.01)
*A22C 25/08* (2006.01)
*A22B 5/00* (2006.01)

(52) U.S. Cl.
CPC *A22C 25/08* (2013.01); *A22B 5/00* (2013.01)

(58) Field of Classification Search
CPC ....... A22C 25/06; A22C 21/0046; A22B 5/06; A01K 81/00; A01K 81/04; A01K 77/00
USPC ............ 452/185, 187–193, 198; 43/5, 6, 12; 294/19.3, 26, 175, 219, 25, 191, 1
See application file for complete search history.

(56) References Cited

U.S. PATENT DOCUMENTS

| | | | |
|---|---|---|---|
| 2,725,253 A * | 11/1955 | Wallman | B66C 1/34 24/599.5 |
| 4,069,922 A | 1/1978 | Hawkins | |
| 4,338,703 A | 7/1982 | Tanner | |
| 4,351,126 A * | 9/1982 | Simonson | A01K 97/14 294/26 |
| 4,691,465 A * | 9/1987 | Dooley | A01K 97/14 294/26 |
| 5,207,337 A | 5/1993 | Massey | |
| 5,791,858 A * | 8/1998 | Sasser | A22B 5/161 414/462 |
| 6,202,664 B1 | 3/2001 | Shenton et al. | |
| 7,059,660 B1 | 6/2006 | Juola | |
| 7,201,552 B1 * | 4/2007 | Angel | A22B 5/06 212/180 |
| 7,931,524 B2 | 4/2011 | McKenzie | |
| 8,479,933 B2 | 7/2013 | Vaquera | |
| 8,702,139 B1 * | 4/2014 | Hurrell | A01M 31/006 294/169 |
| 2009/0100739 A1 * | 4/2009 | Resch | A01K 77/00 43/12 |
| 2010/0303602 A1 * | 12/2010 | Murphy | E04H 4/1272 414/810 |
| 2012/0014009 A1 | 1/2012 | Prendamano | |

* cited by examiner

*Primary Examiner* — Richard Price, Jr.
(74) *Attorney, Agent, or Firm* — The Keys Law Firm PLLC

(57) ABSTRACT

A vehicle mountable hanging hook apparatus for hanging a fish or other game for cleaning in a mobile setting comprises a vertical base defining a square steel pipe sized to fit in the stake pocket of a conventional pickup truck rail and a hook extension arm defining an "L" shaped square member sized to telescopically slide into the top of the vertical base at its proximal end and a lateral section with a hook member at its distal end and a hinged portion that provides a pivot about which the lateral section can swing between a deployed position and a retracted position. When in the deployed position, it is contemplated that the lateral section of the hook extension arm will extend beyond the edge of the vehicle on which it is mounted such that a fish or other game can be hung from the hook member.

11 Claims, 3 Drawing Sheets

VEHICLE MOUNTABLE FISH HANGING HOOK APPARATUS

BACKGROUND OF THE INVENTION

Field of the Invention

This invention relates generally to hoist apparatus and, more particularly, to a hook apparatus configured to be mounted to the side of a truck bed.

Description of the Prior Art

While engaging in fishing related activities, it is well known that it is often desirable once a fish is caught to immediately clean it. A problem which still exists however, is that gutting and cleaning a fish or other game is generally a messy task and finding a suitable place to perform such a task is often difficult. While it is common for some to use make-shift cleaning stations on which a fish can laid, it is well established that hanging the fish over a garbage receptacle is often the most effective and efficient way to clean it. Thus, there remains a need for a vehicle mountable hanging hook apparatus which would eliminate the need for makeshift cleaning arrangements for users seeking to clean fish on site. It would be helpful if such a vehicle mountable hanging hook apparatus was adapted to attach to a vehicle in a plurality of locations. It would be additionally desirable for such a vehicle mountable hanging hook apparatus to include a folding extension arm to enable it to be stored in a compact manner when not in use.

The Applicant's invention described herein provides for a vehicle mountable hanging hook apparatus adapted to extend from a vehicle to provide a structure from which a fish or other game can be hung for cleaning. The primary components in Applicant's vehicle mountable hanging hook apparatus are a vertical base, an extension arm with a hook member. When in operation, the vehicle mountable hanging hook apparatus enables more effective and efficient cleaning of a fish in mobile or remote conditions. As a result, many of the limitations imposed by prior art structures are removed.

SUMMARY OF THE INVENTION

A vehicle mountable hanging hook apparatus for hanging a fish or other game for cleaning in a mobile setting. The vehicle mountable hanging hook apparatus comprises a vertical base defining a square steel pipe sized to fit in the stake pocket of a conventional pickup truck rail and a hook extension arm defining an "L" shaped square member with a vertical section sized to telescopically slide into the top of the vertical base at its proximal end and a lateral section that includes a hook member at its distal end and a hinged portion that provides a pivot about which the lateral section can swing between a deployed position and a retracted position. When in the deployed position, it is contemplated that the lateral section of the hook extension arm will extend beyond the edge of the vehicle on which it is mounted such that a fish or other game can be hung from the hook member in a way that allows a user to place a trash receptacle on the ground directly underneath it.

In alternate embodiments, the vehicle mountable hanging hook apparatus may be clamped to the side of a vehicle with an edge mounting attachment, attached to a vehicle hitch with a hitch mounting attachment, or deployed as a suspended table instead of a hook with a table extension attachment.

It is an object of this invention to provide a vehicle mountable hanging hook apparatus which eliminates the need for makeshift cleaning arrangements for users seeking to clean fish on site.

It is another object of this invention to provide a vehicle mountable hanging hook apparatus adapted to attach to a vehicle in a plurality of locations.

It is yet another object of this invention to provide a vehicle mountable hanging hook apparatus that includes a folding extension arm to enable it to be stored in a compact manner when not in use.

These and other objects will be apparent to one of skill in the art.

DETAILED DESCRIPTION OF THE INVENTION

Figure 1:
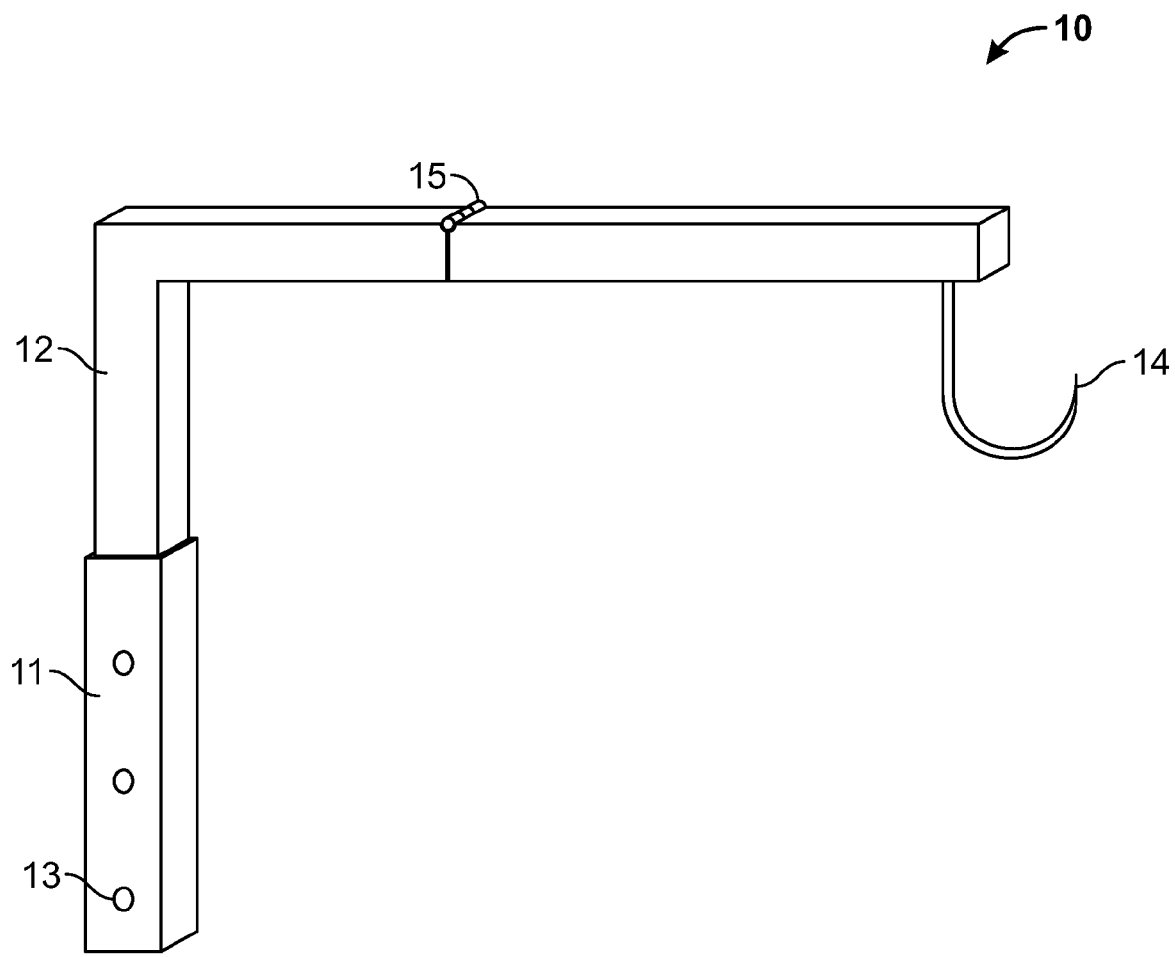
FIG. 1 is a side perspective view of a vehicle mountable hanging hook apparatus built in accordance with the present invention with its extension arm deployed.
Figure 2:
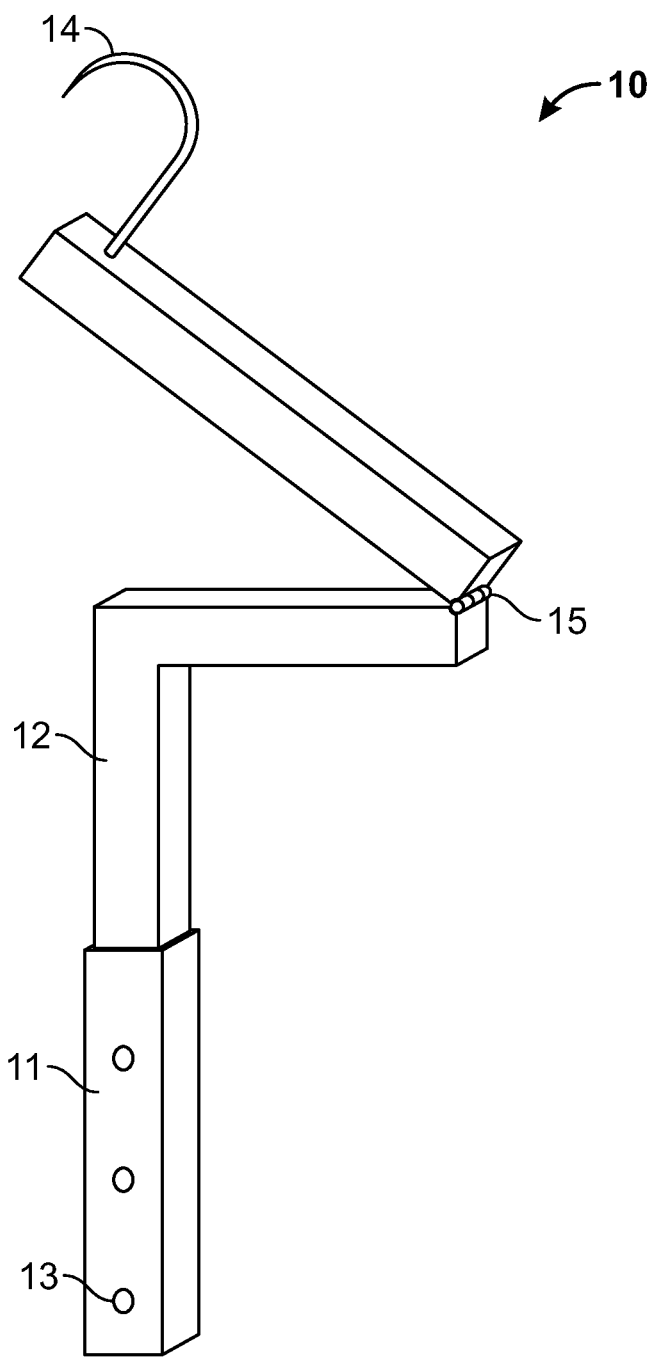
FIG. 2 is a side perspective view of a vehicle mountable hanging hook apparatus built in accordance with the present invention with its extension arm retracted.

Referring now to the drawings and in particular FIGS. 1 and 2, a vehicle mountable hanging hook apparatus 10 is shown having a vertical base 11 and a hook extension arm 12. The vertical base 11 defines in the preferred embodiment a square steel pipe sized to fit in the stake pocket of a conventional pickup truck rail. The hook extension arm 12 defines in the preferred embodiment an "L" shaped square member having a vertical section and a lateral section, with the vertical section sized to telescopically slide into the top of the vertical base at its proximal end. To provide a stopping mechanism to prevent the extension arm 12 from sliding too far down inside the vertical base 11, a user places a rigid bolt (not shown) into a selected bolt hole 13 on the vertical base 11.

The lateral section includes a hook member 14 at its distal end and a hinged portion 15 that provides a pivot about which the lateral section can swing between a deployed position, as shown in FIG. 1, and a retracted position, as shown in FIG. 2. When in the deployed position, it is contemplated that the lateral section of the hook extension arm 12 on an installed vehicle mountable hanging hook apparatus 10 will extend beyond the truck rail (or edge of the vehicle on which it is mounted) such that a fish or other game can be hung from the hook member 14, suspended beyond the vehicle.

Figure 3:
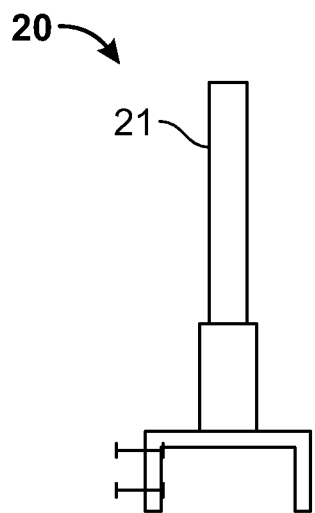
FIG. 3 is a side elevational view of a edge mounting attachment of a vehicle mountable hanging hook apparatus built in accordance with the present invention.

Referring now to FIGS. 1, 2, and 3, in an alternate embodiment of the vehicle mountable hanging hook apparatus 10, an edge mounting attachment 20 is provided as a structure from which the vertical base 11 can be mounted that clamps to an exterior rim of a vehicle (as opposed to the stake pocket). It is contemplated the edge mounting attachment 20 includes an engagement arm 21 that is sized such that it can slide into the vertical base 10 telescopically. To provide a stopping mechanism to prevent the engagement arm 21 from sliding to far up inside the vertical base 11, a user places a rigid bolt (not shown) into a selected bolt hole 13 on the vertical base 11.

Figure 4:
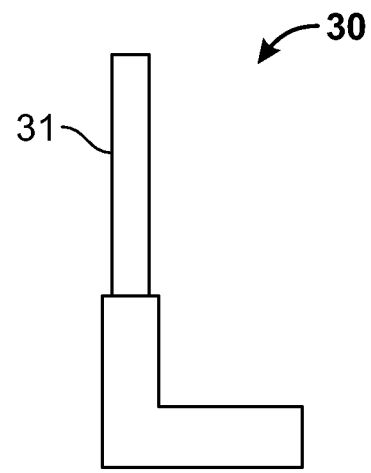
FIG. 4 is a side elevational view of a hitch mounting attachment of a vehicle mountable hanging hook apparatus built in accordance with the present invention.

Referring now to FIGS. 1, 2, and 4, in another alternate embodiment of the vehicle mountable hanging hook apparatus 10, a hitch mounting attachment 30 is provided as a structure from which the vertical base 11 can be mounted from a hitch. It is contemplated the hitch mounting attachment 30 includes an engagement arm 31 that operates in the same manner as the engagement arm of the edge mounting attachment.

Figure 5:
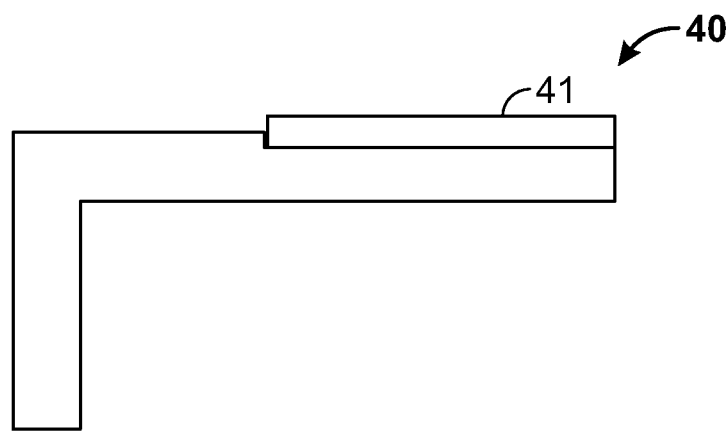
FIG. 5 is a side elevational view of a table extension attachment of a vehicle mountable hanging hook apparatus built in accordance with the present invention.

Referring now to FIG. 5, in yet another alternate embodiment of the present invention, a table extension arm 40 having a table member 41 may be deployed in the alternative to the hook extension arm. It is contemplated that the table extension arm includes a vertical section identical to that of the hook extension arm, thereby enabling it to attach to the vertical base in the same manner.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A utility apparatus for attaching to a mounting vehicle, comprising:
   a vertical base configured to fixedly attach to the mounting vehicle;
   an extension arm defining an L" shaped member having a vertical section and a lateral section, wherein said vertical section is integral with said vertical base, said lateral section is configured to extend laterally relative to an edge of the mounting vehicle, and the lateral section includes a hinged portion and is configured to swing between a linear deployed position and a retracted position defined by an acute angle in the lateral section; and
   a utility body integral with said extension arm and adapted to support at least one of fish or game.

2. The utility apparatus of claim 1, wherein the utility body defines a hook member.

3. The utility apparatus of claim 1, wherein the utility body defines a table member.

4. The utility apparatus of claim 1, wherein said extension arm is telescopically disposed in said vertical base.

5. The utility apparatus of claim 1, wherein the vertical section is telescopically disposed into the vertical base and the utility body disposed on the lateral section.

6. The utility apparatus of claim 1, wherein the vertical base is configured to fit in a stake pocket on the mounting vehicle.

7. The utility apparatus of claim 1, additionally comprising a hitch mounting attachment configured to be mounted from a hitch on the mounting vehicle, wherein the vertical base is additionally configured to attach to the hitch mounting attachment.

8. The utility apparatus of claim 1, additionally comprising an edge mounting attachment configured to be clamped to a ridge on the mounting vehicle, wherein the vertical base is additionally configured to attach to the edge mounting attachment.

9. A utility apparatus for attaching to a mounting vehicle, comprising:
   a vertical base configured to fit in a stake pocket on the mounting vehicle;
   an extension arm defining an L" shaped member having a vertical section and a lateral section, wherein the vertical section is telescopically disposed into the vertical base, the lateral section is configured to extend laterally relative to an edge of the mounting vehicle, and the lateral section includes a hinged portion and is configured to swing between a linear deployed position and a retracted position defined by an acute angle in the lateral section; and
   a hook member integral with said lateral section and adapted to support at least one of fish or game.

10. The utility apparatus of claim 9, additionally comprising a hitch mounting attachment configured to be mounted from a hitch on the mounting vehicle, wherein the vertical base is additionally configured to attach to the hitch mounting attachment.

11. The utility apparatus of claim 9, additionally comprising an edge mounting attachment configured to be clamped to a ridge on the mounting vehicle, wherein the vertical base is additionally configured to attach to the edge mounting attachment.

* * * * *